United States Patent Office 2,788,188
Patented Apr. 9, 1957

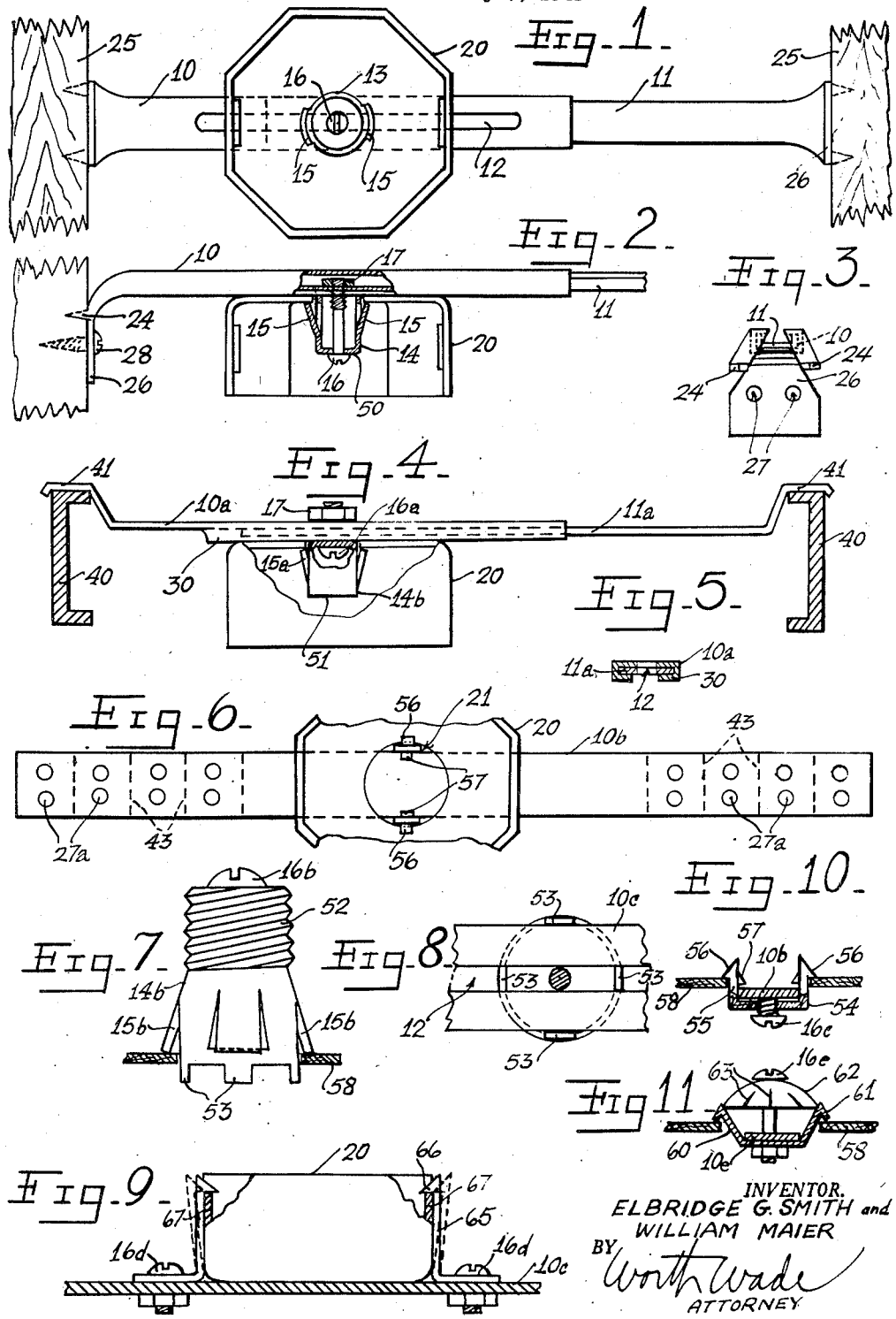

2,788,188

ELECTRICAL OUTLET FIXTURES

Elbridge G. Smith, Roosevelt, and William Maier, Long Island City, N. Y., assignors to William Maier, Bridgeport, Conn.

Application July 7, 1948, Serial No. 37,428

9 Claims. (Cl. 248—57)

This invention relates to electrical wiring and fixtures therefor and in particular to means for mounting electrical outlets in wall structures.

It is customary in either dry wall or wet wall construction to provide space for mounting an electrical outlet box. At the present time such boxes are shipped unassembled and it is necessary for the electrician to assemble the box on the site. This operation of assembly normally requires about fifteen minutes. Moreover, it is very difficult to locate the box in exactly the right position with respect to the surface of the finished wall. Normally an electrical outlet box is mounted by screws on a wooden cross bar which has to be specially measured and cut to fit exactly between the upright wall studs or between the overhead ceiling beams. Since the studs and beams are never spaced the same distance apart, it is not possible to pre-cut the mounting bars. Thus, additional time is lost in mounting the box in the wall or ceiling.

Accordingly, it is a general object of the present invention to provide means for rapidly and efficiently mounting an electrical outlet box in a wet or dry wall construction.

It is another object of the invention to provide a mounting for an electrical outlet box which will be adjustable and easily adapted to variable spaces between beams and studs and without obstructing the surface.

It is another object of the present invention to provide an electrical outlet which can be assembled quickly and with simple tools.

Other objects of the invention will in part be obvious and will in part appear hereinafter.

According to the present invention there is provided an electrical fixture comprising an electrical outlet box, a support for the box which is adjustable lengthwise, resilient means on the support for snapping the box into rigid position on the support and preferably means for supporting an electrical fixture on the box-mounting means.

In carrying out the invention, there is provided an adjustable, and preferably extensible, support which is adapted to be mounted between two adjacent beams or studs. The support is provided with resilient means for mounting the electrical outlet box thereon. The box is mounted by forcing it into position against resilient members, preferably leaf springs. Once the box has been snapped into position, a bolt may be used to tighten the mounting means to the support whereby the box is held rigidly in its proper position.

Referring to the drawing, Fig. 1 represents a top plan view of one embodiment of the complete electrical mounted outlet;

Fig. 2 is a side elevation of the fixture shown in Fig. 1;

Fig. 3 is a cross-section of a portion of the device of Fig. 2 taken along the line 3—3 thereof;

Fig. 4 is a side elevation of a second embodiment of the electrical fixture;

Fig. 5 is a cross-section of a portion of Fig. 4 taken along the line 5—5 thereof;

Fig. 6 is a top plan view of a third embodiment of the supporting means;

Fig. 7 is a detailed view, in side elevation, of a preferred form of the box fastening means;

Fig. 8 is a top plan view of the base of the box showing a portion of the mounting means in section;

Fig. 9 is a side elevation, partly in section, of a fourth embodiment of the fixture of the invention;

Fig. 10 is a side elevation, partly in section, of the locking means used in the embodiment shown in Fig. 6; and Fig. 11 is a side elevation, partly in section, of another embodiment of the locking means.

In the preferred embodiment the supporting means comprises a pair of telescopic members 10 and 11, the outer member being provided with an elongated slot 12 on which is mounted the box support, catch or snap-on stud 13 which comprises a cylindrical shell 14 having at least one spring tab 15 and being mounted on the supporting rods by means of a bolt 16 which passes through the slot 12 and is threaded into the nut 17. The electrical outlet box 20 may be of conventional design. These boxes are normally provided with one or more pre-punched holes, one of the holes being centrally located in the bottom of the box. Accordingly, the support 13 is so designed that the edges of the bottom hole 21 will not slip over the support without depressing the spring tab 15, but when the box is fully seated against the support as shown in Fig. 2, the tab springs outward and prevents the box from being withdrawn from the support. Thus, the box is mounted on the supporting rods 10 and 11 by pushing it down over the catch 13 and snapping it into place. Thereafter the bolt 16 is given a few turns with a screw driver to tighten it.

As shown in Fig. 3, the slotted rod 10 encloses the U-shaped bar 11, the nut 17 of the bolt being accommodated in the enclosed space 22. To permit rigid mounting of the supporting rods 10 and 11, these rods have their opposite ends turned at right angles so that the flanges 26 will lie flat against the beams or studding 25. To facilitate pre-positioning of the support, the flange is cut away at the sides to provide one or more pointed tabs 24 which can be forced into the wooden members such as beams or studding, for temporary holding. The flanges may be provided with one or more holes 27 to accommodate screws, 28, or bolts or nails for permanent anchorage.

Another embodiment and several variations are shown in Fig. 4. This embodiment comprises supporting rods which are relatively flat at each end, but rod 10a has its edges 30 bent over to partly enclose the flat rod 11a. Both rods are provided with slots to receive the bolt 16a and the nut 17a is thus mounted on the outside (or back) of the rod 10a.

In the construction of suspended ceilings for fireproof construction, the ceiling is suspended from overhead beams by means of a plurality of spaced channel beams 40. If desired the supporting rods 10a and 11a are pre-cut as shown in Fig. 4 so that a portion 41 at the end of each rod rides on the top surface of the channel beams. In this embodiment no bolts or screws are required to fix the sections 41 to the channel beam.

In that embodiment shown in Fig. 6, the supporting rod comprises a single elongate rod 10b which is provided with a centrally disposed elongate slot 12 and each end of the rod is provided with equally spaced points with a weakened area which can be a grooved, embossed or etched line 43 and there is positioned between such lines one or more holes 27a which may accommodate bolts or screws 28. In utilizing this type of rod, one or both ends of the rod may be broken along one of the weakened lines 43 by bending it back and forth along such line until the rod breaks off. Thereafter, the next adjacent section to the broken point is bent at right angles to the rod to provide the mounting tab 29a.

Many variations may be made in the form and position of the resilient snap-on stud or catch which locks the box to the support. In Figs. 1 and 2 the catch comprises a cylindrical shell 14 which is closed at the top 50 and comprises the resilient tabs 15. In Fig. 4 the catch is a cylindrical shell 14a which is open at its free end 51 and comprises at least two resilient tabs 15a and is anchored to the rods by means of the bolt 16a.

In Fig. 7 there is shown a special embodiment of the catch which provides, in addition, means for supporting a lighting fixture. This catch comprises a shell 14b having out-flaring resilient flanges 15b and having a threaded area 52 on which may be threaded the female member of a lighting fixture. This catch is maintained in the manner shown in Figs. 1 and 2 by means of the bolt 16b, the bolt passing through the slot 12 as shown in Fig. 8. In order to prevent the catch from rotating, its lower end is provided with four dependent tabs 53, two of which pass into the slot 12 and the other two of which straddle the supporting bar 10b.

All of the catches shown in Figs. 1, 2, 4 and 7 extend into the box 20 and occupy therein considerable space. To reduce the space and to avoid the use of a slotted rod, there may be provided a catch of the type shown in Fig. 10 which comprises a U-shaped member 54 which encloses the rod 10b of the type shown in Fig. 6, each arm 55 being provided with at least one barb 56 adapted to catch on the edge of the hole in the base 58 of an outlet box 20. In order to prevent the catch from being displaced from the rod during shipment, it may also be provided with barbs 57 which rest on the rod 10b.

In Fig. 11 another shallow type of catch is described comprising the resilient cup 60, the rim 61 being bent over and bearing against the base 56 of the outlet box 20. Pressure may be applied to expand the edges by means of a thin metal cap 62, the edges being slotted toward the center along the line 63. When the bolt 16c is tightened, the cap will tend to expand and spread the rim 61.

In Fig. 9 there is shown a catch which is positioned outside the box comprising at least two oppositely positioned L-shaped members 65 having sloped barbs 56, the barbs slipping over the edge of the wall 67 of the box 20 at its corners where the edge is normally cut away. Thus, no portion of the catch 65 extends above the box and the interior of the box is entirely free.

Since many variations can be made in the structure of the various elements in the combination without transcending the scope of the invention, the invention is not to be limited except as indicated in the appended claims.

We claim:

1. In combination with an electrical outlet box having an opening in the base thereof and a supporting bar comprising a pair of relatively slidable bar members, one only being slotted; a snap-on stud for said outlet box having means for attachment to said slotted supporting bar member, leaving the other bar member free to move relatively to the slotted member, and being of such dimensions as to permit the opening of the base of the outlet box to be pressed over the outer portion thereof when the stud is secured to the supporting bar, said stud having resilient means permitting the base of the box to be pressed into fully seated position against said support but preventing removal thereof without removal of the stud from the base, said resilient means comprising spring tabs inclining outwardly from the wall portion of the stud toward the base thereof and which terminate sufficiently short of the supporting bar when the stud is attached thereto to permit the base of the outlet box to lie between said supporting bar and the ends of the spring tabs.

2. A snap-on stud for an electrical outlet box as set forth in claim 1, wherein the stud is provided with means coacting with the slotted supporting bar member for preventing rotation of the stud.

3. A snap-on stud for an electrical outlet box as set forth in claim 1, wherein the stud is of tubular form and is provided with a threaded portion for attachment to a lighting fixture.

4. The combination as set forth in claim 1, wherein the snap-on stud is provided with projections extending through the opening in the base of the outlet box and into the slot in said slotted supporting bar member to prevent rotation of the stud.

5. The combination as set forth in claim 4, wherein the snap-on stud is provided with additional projections straddling the slotted supporting bar member.

6. An electrical outlet fixture comprising an extensible support adapted to be mounted between spaced beams or the like of a building structure, said support comprising a pair of elongated members having cooperating longitudinal flanges permitting longitudinal adjustment relative to each other, one of which members is slotted lengthwise, a snap-on stud for an outlet box, and bolt and nut means for removably securing the snap-on stud to the slotted support member only while leaving the other member free to move relative to the slotted member, said support members having flanged end portions for attachment to spaced beams or the like of a building structure, and said stud being provided with spring clips to receive and retain an outlet box.

7. An electrical outlet fixture comprising an extensible support adapted to be mounted between spaced beams or the like of a building structure, said support comprising a pair of elongated rod members having cooperating longitudinal flanges permitting longitudinal adjustment relative to each other, one of which members is slotted lengthwise, a snap-on stud for an outlet box, and adjustable fastening means for removably securing the snap-on stud to the slotted support member only while leaving the other rod member free to move relative to the slotted member, said support members having end portions for attachment to spaced beams or the like of a building structure, and said stud being provided with spring clips to receive and retain an outlet box.

8. An electric outlet fixture as set forth in claim 7, wherein the fastening means comprises a bolt extending through the stud and through the slotted rod member, and a nut for said bolt within the confines of the slotted rod member of the extensible support.

9. An outlet fixture as set forth in claim 8 having an outlet box mounted upon the snap-on stud.

References Cited in the file of this patent

UNITED STATES PATENTS

| | | |
|---|---|---|
| 1,133,535 | Cain et al. | Mar. 30, 1915 |
| 1,135,699 | Knauber | Apr. 13, 1915 |
| 1,215,595 | Weikert | Feb. 13, 1917 |
| 1,789,124 | Wever | Jan. 13, 1931 |
| 1,812,756 | Riggs | June 30, 1931 |
| 1,933,358 | Almcrantz | Oct. 31, 1933 |
| 1,961,728 | Arnest et al. | June 5, 1934 |
| 2,126,259 | Howell et al. | Aug. 9, 1938 |
| 2,140,861 | Steketee | Dec. 20, 1938 |
| 2,181,966 | Dean | Dec. 5, 1939 |
| 2,303,148 | Tinnerman | Nov. 24, 1942 |
| 2,316,389 | Atkinson | Apr. 13, 1943 |
| 2,326,903 | Tinnerman | Aug. 17, 1943 |
| 2,512,188 | Waite et al. | June 20, 1950 |